(No Model.)
A. M. HEWLETT.
PIPE DRAWING TOOL.
No. 537,459. Patented Apr. 16, 1895.
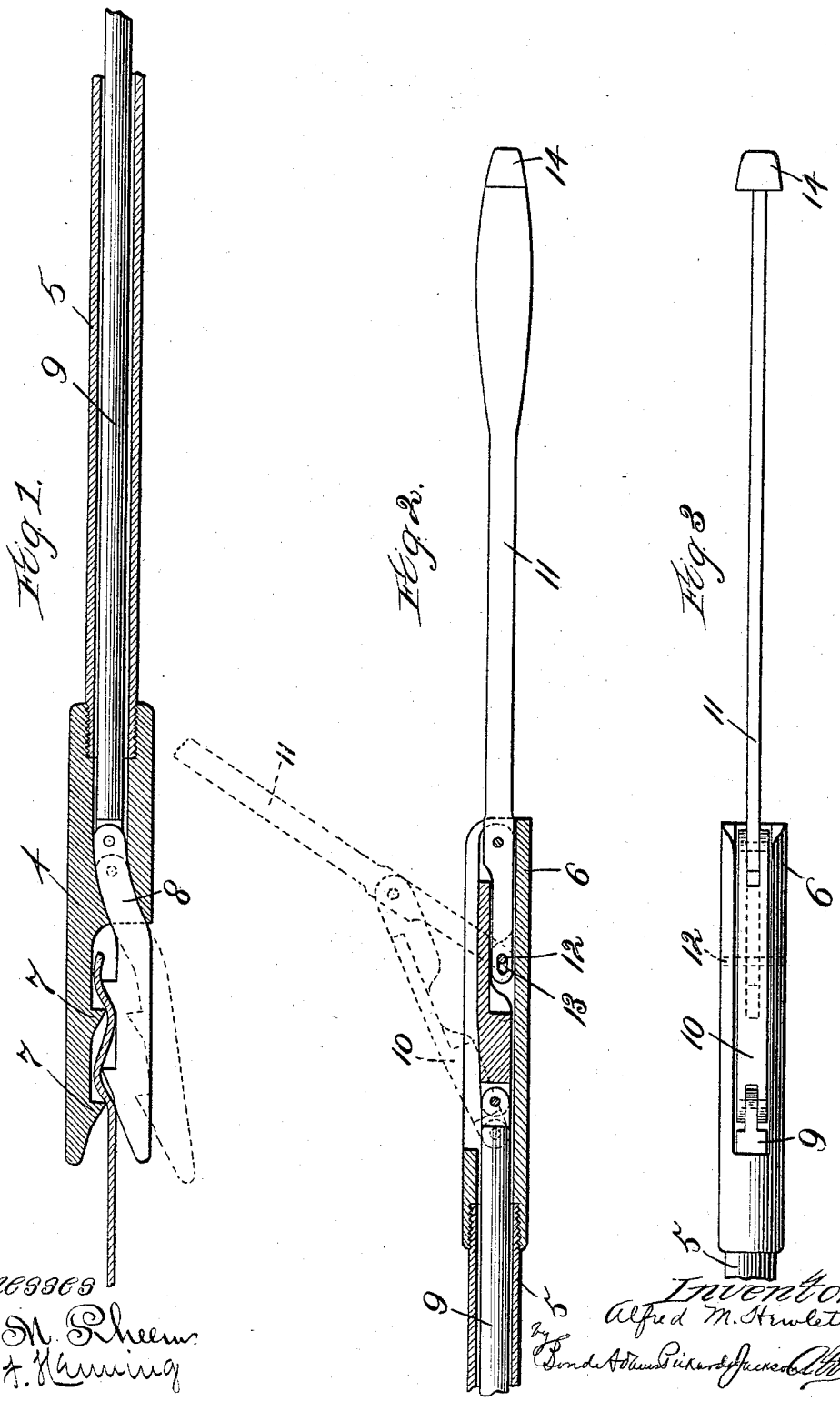

UNITED STATES PATENT OFFICE.

ALFRED M. HEWLETT, OF KEWANEE, ILLINOIS.

PIPE-DRAWING TOOL.

SPECIFICATION forming part of Letters Patent No. 537,459, dated April 16, 1895.

Application filed April 24, 1894. Serial No. 508,894. (No model.)

*To all whom it may concern:*

Be it known that I, ALFRED M. HEWLETT, a citizen of the United States, residing at Kewanee, Henry county, Illinois, have invented certain new and useful Improvements in Pipe-Drawing Tools, of which the following is a specification, reference being had to the accompanying drawings, in which—

Figure 1 is a longitudinal vertical section of the forward part of the tag. Fig. 2 is a longitudinal vertical section of the rear portion thereof. Fig. 3 is a plan view of the parts shown in Fig. 2.

My invention relates to the manufacture of butt weld pipe by drawing a skelp through a bell.

It has for its object to provide an improved tag or tongs by means of which the skelp may be seized and drawn through the bell. I accomplish this object as hereinafter specified and as illustrated in the drawings.

That which I regard as new will be set forth in the claims.

In the drawings,—4 indicates a stationary jaw, which is connected by a tubular handle 5 to a handle-support 6, as shown in Fig. 2. The jaw 4 is provided with suitable teeth 7 for gripping the skelp.

8 indicates a movable jaw, which is pivotally connected to a rod 9 arranged within the tube 5 and extending back to the handle support 6. The rear portion of the jaw 8 is arranged at an angle to the main portion thereof, as shown in Fig. 1, and it is adapted to enter an inclined passage in the body of the jaw 4, the arrangement being such that by drawing back the rod 9 the end of the jaw 8 will be drawn into said passage and the jaws thereby be tightly brought together. The tightness of the grip of the jaws will be determined by the pull upon the rod 9.

The rod 9 is connected at its rear end by a link 10 to a handle 11, the link 10 being pivoted to said handle at a point between its ends, as best shown by dotted lines in Fig. 2. The forward end of the handle 11 is pivotally connected to the handle-support 6 by a pin 12, which is secured in the handle-support and passes through a slot 13 in the end of the handle, as shown in Fig. 2. The link 10 is preferably hollow in the under side to adapt it to fit over the end of the handle, as shown by full lines in Fig. 2. By this construction, when the handle 11 is raised to the position indicated by dotted lines, the rod 9 will be moved forward, thereby causing the jaw 8 to drop away from the stationary jaw 4. By moving the handle 11 into line with the handle-support 6 and the rod 9, the rod 9 will be moved back, thereby closing the jaws. After the jaws are closed the grip may be further tightened by pulling back the handle 11, as the slot 13 permits of slight longitudinal movement of said handle.

As shown in Fig. 3, the handle 11 is provided at its end with a knob 14, by means of which it may be connected to the drawing mechanism.

When the parts are moved into line as shown in Figs. 1 and 2 the tool may readily be drawn through the bell.

That which I claim as my invention, and desire to secure by Letters Patent, is—

1. A pair of tongs consisting of two members, one of said members having a jaw and an inclined passage, the other of said members consisting of a jaw one end of which is adapted to move in said passage, and a rod and lever for operating said second jaw, substantially as described.

2. A pair of tongs consisting of two members, one of said members having a jaw and an inclined passage, the other of said members consisting of a jaw one end of which is adapted to move in said passage, a rod connected to said movable jaw, a tube incasing said rod, and a lever for reciprocating said rod, substantially as described.

3. A pair of tongs consisting of two members, one of said members having a jaw and an inclined passage, the other of said members consisting of a jaw one end of which is adapted to move in said passage, a rod connected to said movable jaw, a tube incasing said rod, a lever pivoted at the rear of said tube, and a link connecting said lever and said rod, whereby by operating said lever said rod may be reciprocated, substantially as described.

4. A pair of tongs consisting of two members, one of said members having a jaw and an inclined passage, the other of said members consisting of a jaw one end of which is adapted to move in said passage, a rod connected to said movable jaw, a tube incasing said rod, a lever pivoted at the rear of said tube, and a link connecting said lever and said rod, whereby by operating said lever said rod may be reciprocated, said link being adapted to move into line with said lever when the lever is operated to close the jaws, substantially as specified.

5. A pair of tongs consisting of two members, one of said members having a jaw and an inclined passage, the other of said members consisting of a jaw one end of which is adapted to move in said passage, a rod connected to said movable jaw, a tube incasing said rod, a lever pivoted at the rear of said tube, and a link connecting said lever and said rod, whereby by operating said lever said rod may be reciprocated, said link having a recess adapted to receive the end of said lever, whereby the link may be moved into line with said lever when the lever is operated to close the jaws, substantially as described.

6. A pair of tongs consisting of two members, one of said members having a jaw and an inclined passage, the other of said members consisting of a jaw one end of which is adapted to move in said passage, a rod connected to said movable jaw, a tube incasing said rod, a lever pivoted at the rear of said tube, said lever being movable longitudinally of said tube, and a link connecting said lever and said rod, whereby by operating said lever said rod may be reciprocated, substantially as described.

7. The combination with a stationary jaw, a handle-support, and a tube connecting said jaw and handle-support, of a movable jaw, a rod pivoted to said movable jaw, a lever loosely pivoted in said handle-support, whereby it may be moved longitudinally of said support, and a link connecting said lever and said rod, substantially as described.

8. A pair of tongs comprising gripping-jaws, combined with a lever which serves to open and close the jaws with equal force, a rod connected with the lever, and a pipe or tube in which the rod is incased, substantially as described.

9. A pipe-drawing tool, consisting of two jaws which grip the skelp, a lever, and a rod connecting the lever with one of the jaws for forcibly opening and closing the jaws, substantially as described.

ALFRED M. HEWLETT.

Witnesses:
JOHN L. JACKSON,
RALPH VAN DYKE.